(12) United States Patent
Goller et al.

(10) Patent No.: US 8,562,434 B2
(45) Date of Patent: Oct. 22, 2013

(54) METHOD AND SYSTEM FOR SHARING SPEECH RECOGNITION PROGRAM PROFILES FOR AN APPLICATION

(75) Inventors: Michael D. Goller, Cincinnati, OH (US); Stuart E. Goller, Cincinnati, OH (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/350,150

(22) Filed: Jan. 13, 2012

(65) Prior Publication Data

US 2012/0184370 A1 Jul. 19, 2012

Related U.S. Application Data

(60) Provisional application No. 61/433,235, filed on Jan. 16, 2011.

(51) Int. Cl.
*G06F 19/00* (2011.01)

(52) U.S. Cl.
USPC .......... 463/36; 704/270.1; 704/275; 704/231; 704/251; 715/748; 715/978; 725/13

(58) Field of Classification Search
USPC ............ 704/275, 270.1, 235, 270, 276, 243, 704/231, 251; 701/3, 12, 16; 706/11, 45; 455/557, 566, 563; 715/978, 202, 748; 379/88.01, 93.01; 463/36; 725/13
See application file for complete search history.

(56) References Cited

U.S. PATENT DOCUMENTS

| | | | |
|---|---|---|---|
| 5,893,064 A | 4/1999 | Kudirka et al. | |
| 6,009,458 A | 12/1999 | Hawkins et al. | |
| 6,352,479 B1 | 3/2002 | Sparks, II | |
| 6,400,996 B1 * | 6/2002 | Hoffberg et al. | 700/83 |
| 6,538,666 B1 | 3/2003 | Ozawa et al. | |
| 6,839,435 B1 | 1/2005 | Iijima et al. | |
| 6,979,267 B2 | 12/2005 | Leen et al. | |
| 7,006,881 B1 * | 2/2006 | Hoffberg et al. | 700/83 |
| 7,085,722 B2 | 8/2006 | Luisi | |
| 7,555,749 B2 | 6/2009 | Wickham et al. | |
| 7,620,948 B1 | 11/2009 | Rowe et al. | |
| 7,621,813 B2 | 11/2009 | Bortnik et al. | |
| 7,798,905 B2 | 9/2010 | Thompson et al. | |
| 7,887,419 B2 | 2/2011 | Bortnik et al. | |
| 7,890,957 B2 * | 2/2011 | Campbell | 719/313 |
| 7,997,987 B2 | 8/2011 | Johnson et al. | |
| 8,015,006 B2 | 9/2011 | Kennewick et al. | |
| 8,112,275 B2 | 2/2012 | Kennewick et al. | |
| 8,128,501 B2 | 3/2012 | Theimer et al. | |
| 8,370,147 B2 * | 2/2013 | Kennewick et al. | 704/257 |
| 2004/0111259 A1 | 6/2004 | Miller et al. | |
| 2006/0178209 A1 | 8/2006 | Shultz | |
| 2007/0117629 A1 | 5/2007 | Fowler et al. | |

(Continued)

*Primary Examiner* — Vijay B Chawan

(74) *Attorney, Agent, or Firm* — McDonnell Boehnen Hulbert & Berghoff LLP

(57) ABSTRACT

An embodiment provides a system and method for sharing between computing devices via a sharing interface, a speech recognition program profile for one or more applications. Another embodiment provides a system and method for sharing between computing devices via an sharing interface, a speech recognition program profile for one or more games. In an embodiment of the invention a personal computer or tablet may comprise a computing device and or a sharing interface. In an embodiment of the invention a cell phone may comprise a computing device and or a sharing interface. In an embodiment of the invention a game play device may be a computing device and or a sharing interface.

43 Claims, 11 Drawing Sheets

(56) References Cited

U.S. PATENT DOCUMENTS

| | | |
|---|---|---|
| 2007/0173321 A1 | 7/2007 | Shen et al. |
| 2009/0150156 A1* | 6/2009 | Kennewick et al. .......... 704/257 |
| 2009/0298593 A1 | 12/2009 | Kobayashi et al. |
| 2011/0066634 A1* | 3/2011 | Phillips et al. ................ 707/769 |
| 2012/0101809 A1* | 4/2012 | Kennewick et al. .............. 704/9 |
| 2012/0101810 A1* | 4/2012 | Kennewick et al. .............. 704/9 |
| 2012/0158719 A1* | 6/2012 | Gannu et al. .................. 707/732 |
| 2012/0278824 A1* | 11/2012 | Patil et al. ...................... 725/13 |

* cited by examiner

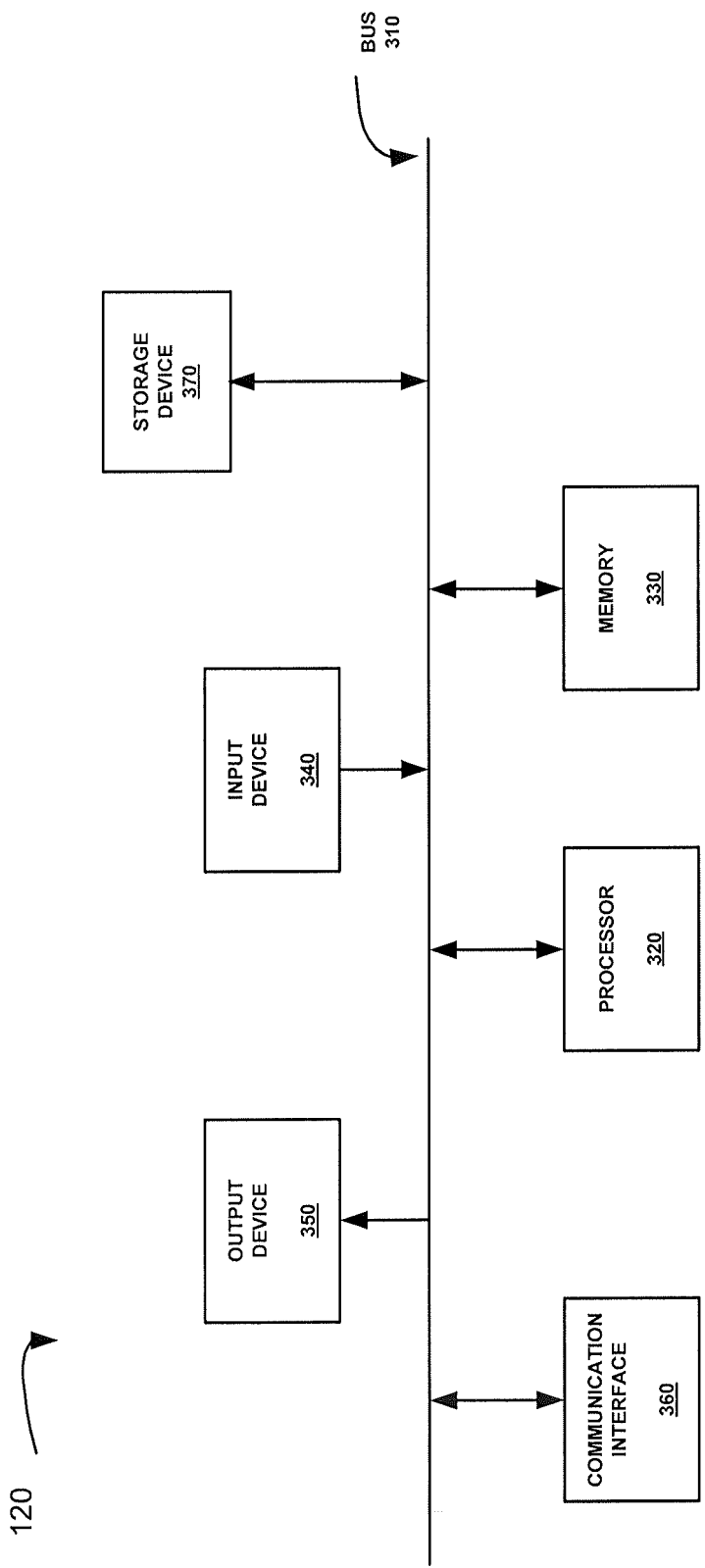

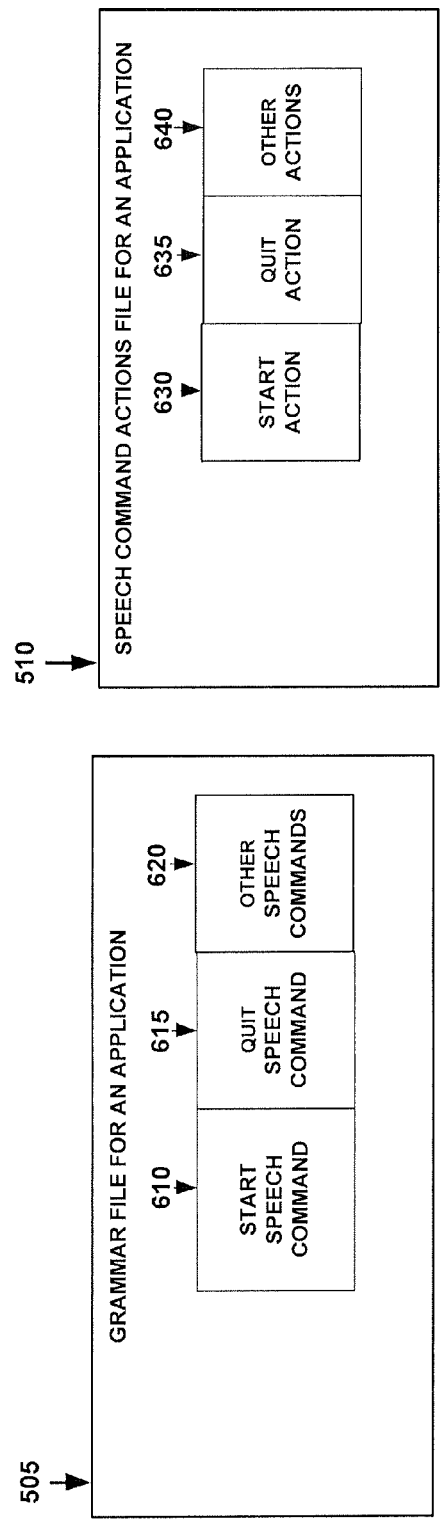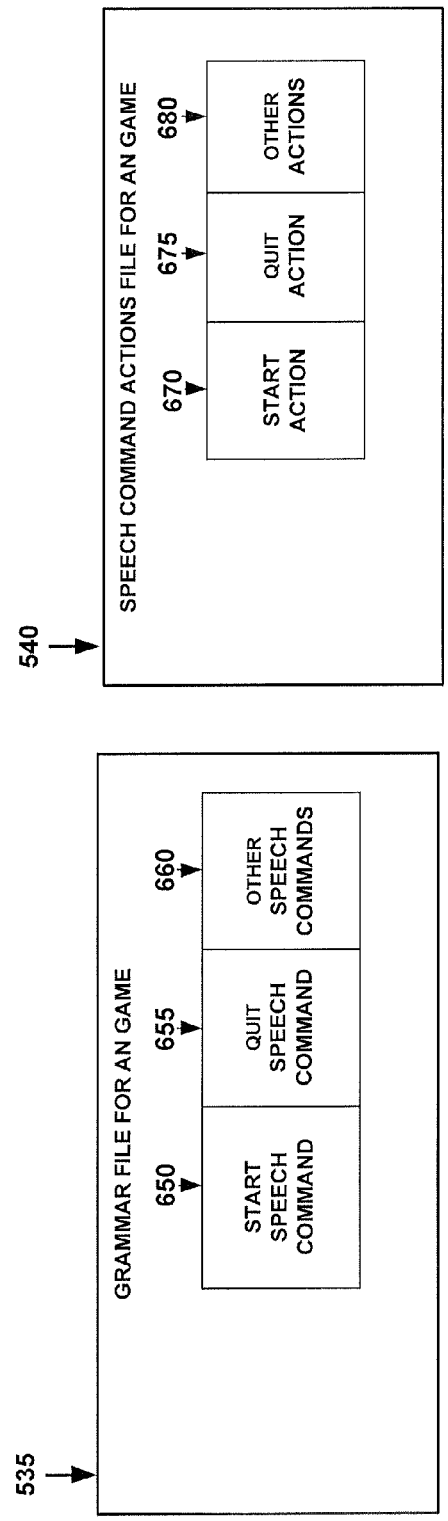
FIG. 6A
FIG. 6B
FIG. 6C
FIG. 6D

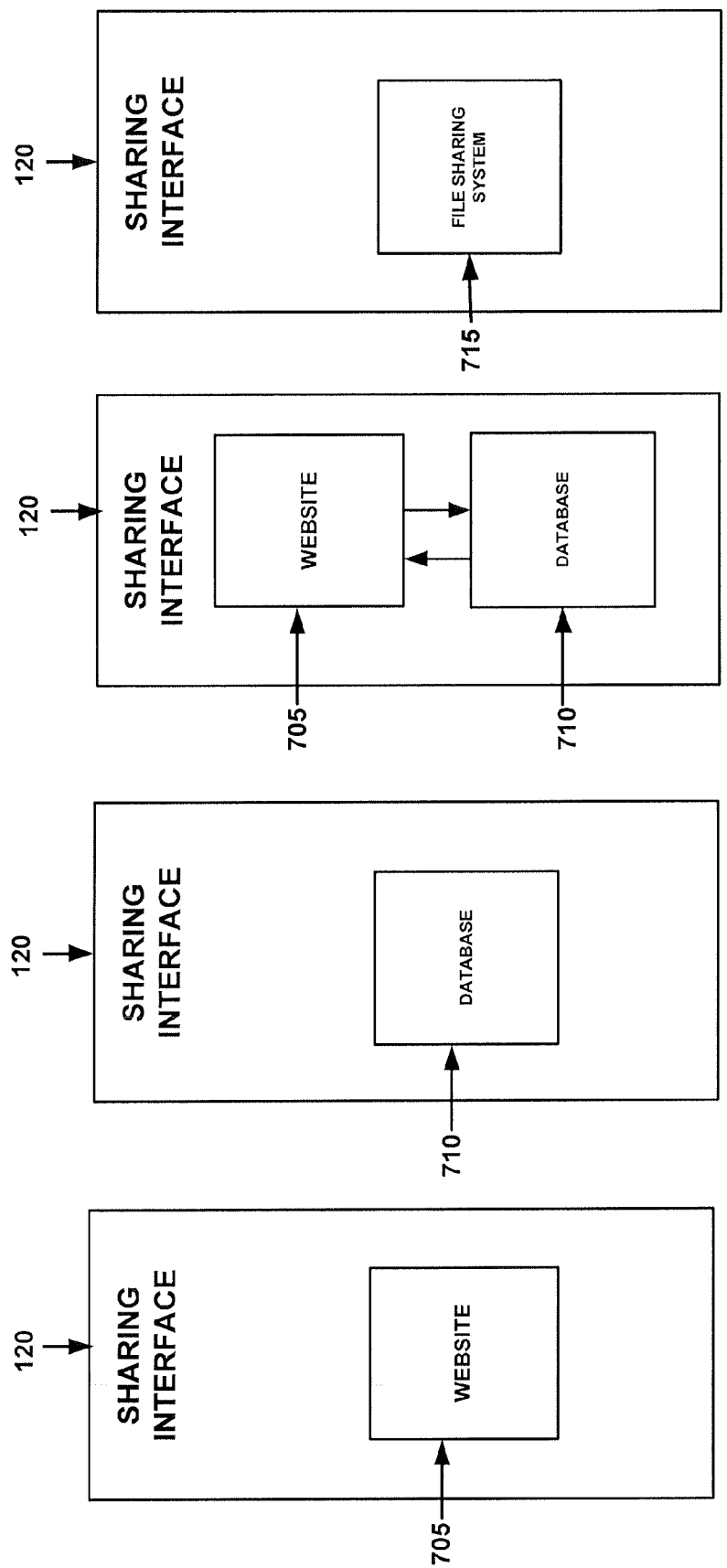

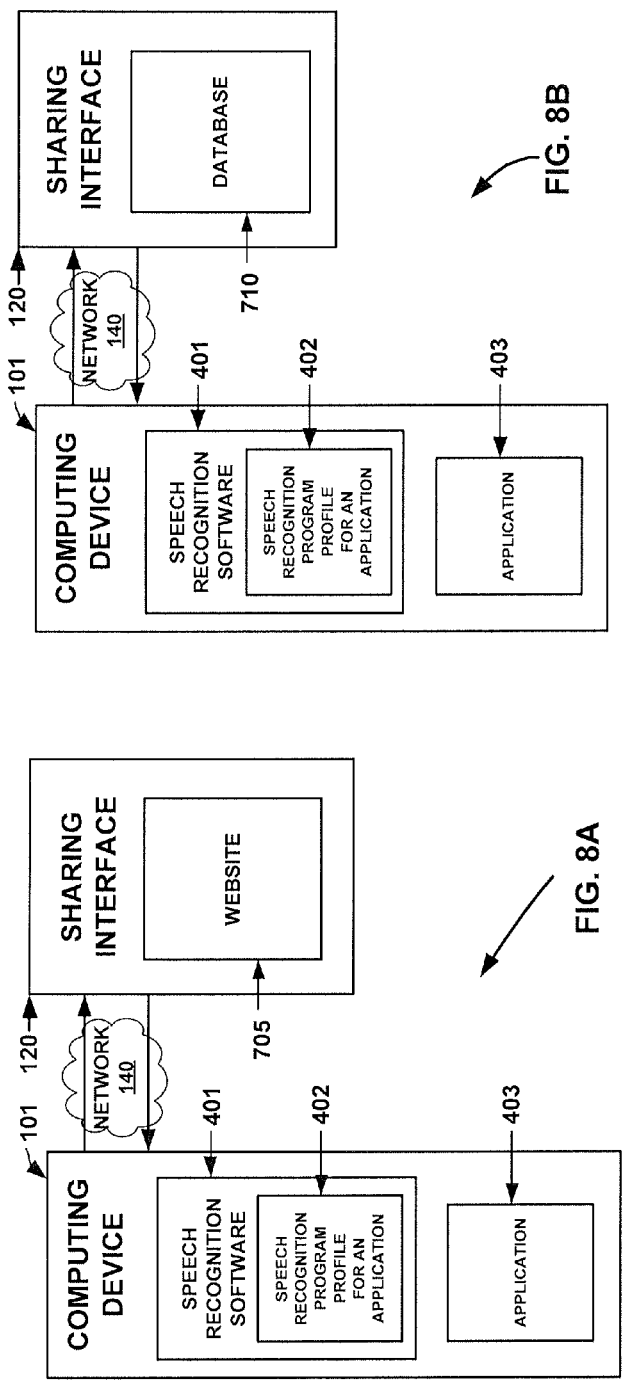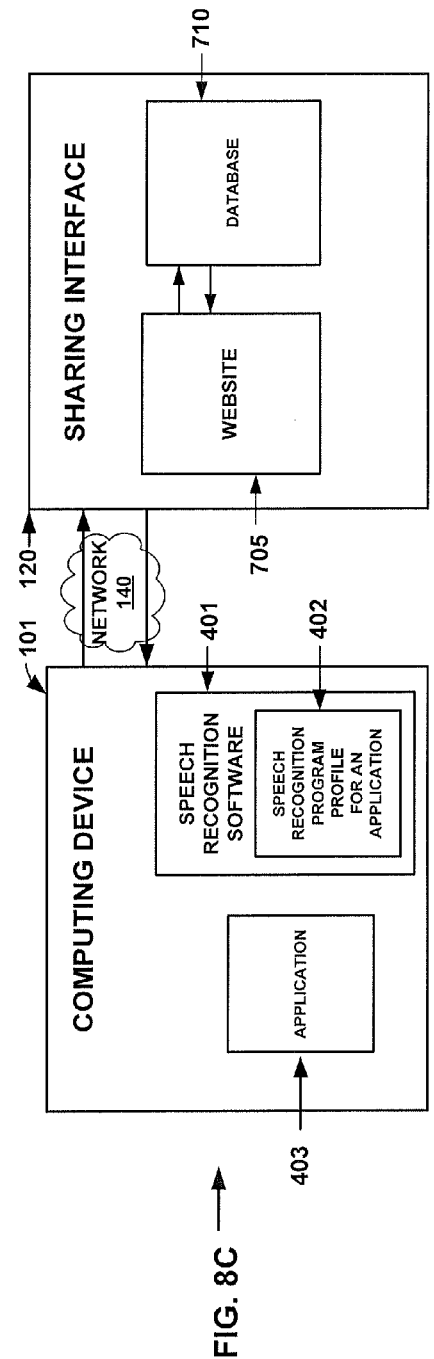

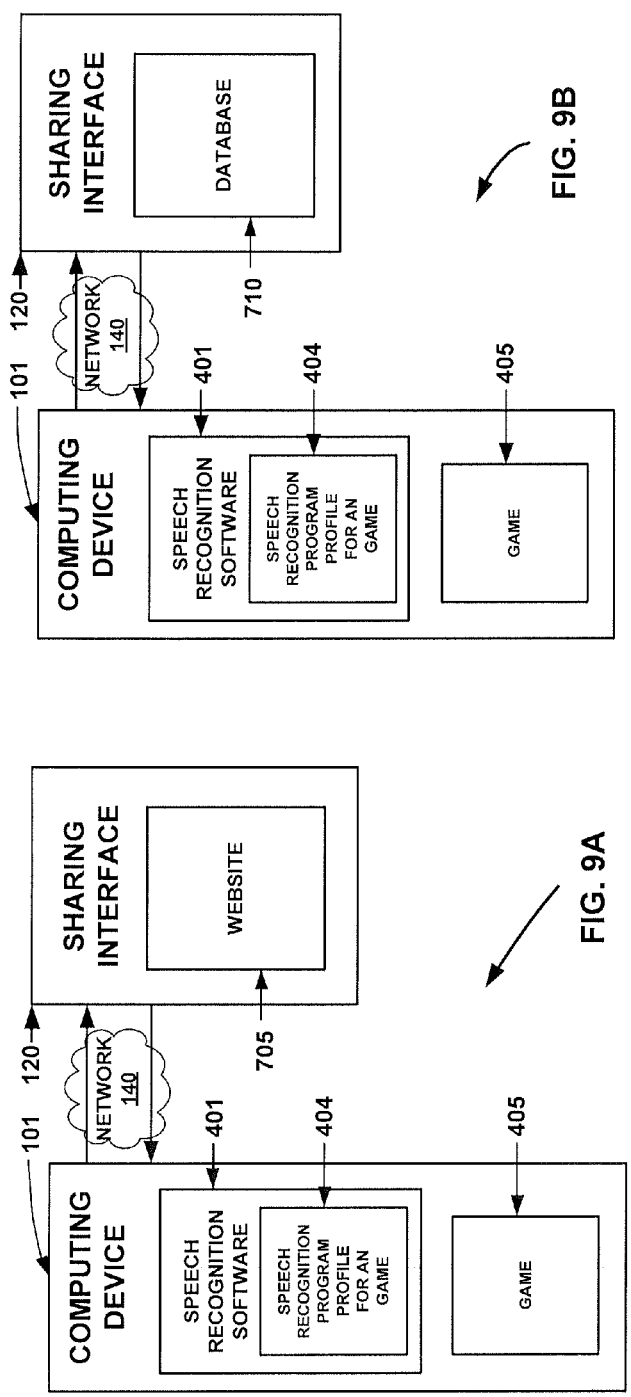
FIG. 9A
FIG. 9B
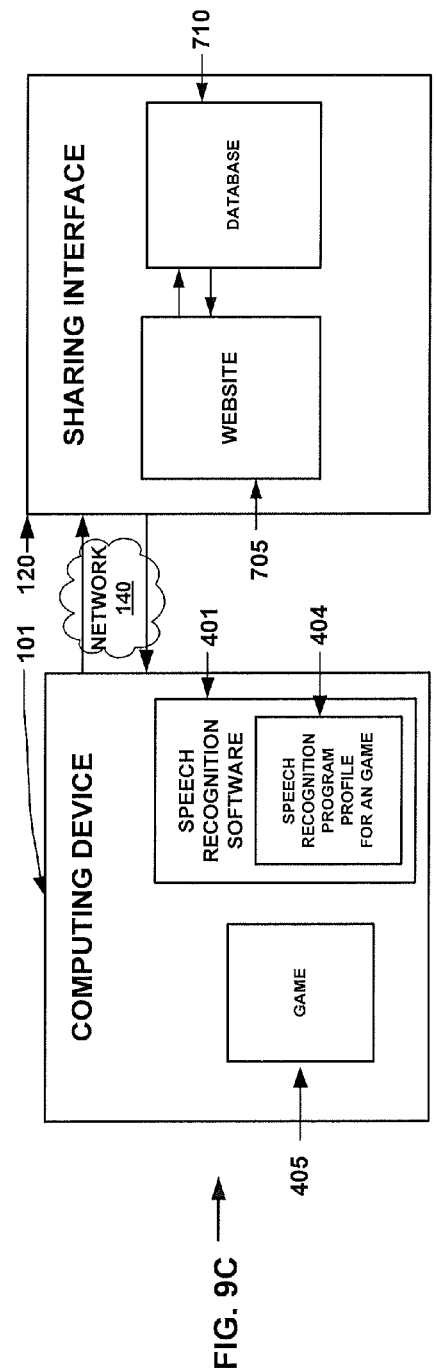
FIG. 9C

US 8,562,434 B2

METHOD AND SYSTEM FOR SHARING SPEECH RECOGNITION PROGRAM PROFILES FOR AN APPLICATION

PRIORITY

This application claims priority to U.S. Provisional Patent Application Ser. No. 61/433,235, filed Jan. 16, 2011, entitled "METHOD AND SYSTEM FOR SHARING SPEECH RECOGNITION PROGRAM PROFILES FOR AN APPLICATION," the disclosure of which is incorporated by reference herein.

FIELD OF INVENTION

The present invention relates generally to the field of sharing one or more "speech recognition program profiles for applications" created or residing in a speech recognition software in a computing device, with speech recognition software in one or more other computing devices; enabling a user to utilize speech recognition software to interact with an application and more specifically, to creating a speech recognition program profile for an application, management of the sharing process through uploading a speech recognition program profile for an application to a sharing interface, allowing a user to select and download from the sharing interface one or more speech recognition program profiles for applications available for download to a speech recognition software in a computing device, followed by the speech recognition software being able to utilize the downloaded speech recognition program profile for an application to interact with the application the profile was created for. A computer software is an application consistent with this invention. A computer game is a type of application consistent with this invention. A personal computer software is an application consistent with this invention. A tablet software is a type of application consistent with this invention. A mobile application is a application consistent with this invention.

BACKGROUND OF THE INVENTION

Speech recognition systems, i.e. systems for recognizing spoken language, are rapidly increasing in significance in many areas of data and communications technology. Speech recognition systems typically are comprised of a computing system loaded with a speech recognition software for processing. Many speech recognition software have a grammar, sometimes also called a dictionary, either built in or in some other way available to the software.

Speech recognition software can be constructed for installation and use in computing devices that may be servers, client devices or other computing devices.

Speech recognition software designed for use in computing devices are currently available from companies such as Voice Tech Group, Inc., IBM, Nuance, Phillips, Loquendo, and Microsoft as well as others. Some suppliers manufacture speech recognition software for cell phone, GPS, PDA, game devices, autos and other hardware systems.

Speech recognition software are currently used in many applications such as voice recognition, voice search, interactive voice response systems, command recognition systems giving direction to a computer or device, dictation mode systems including medical transcription, speaker identification, speech analytics, keyword processing, automotive applications, game applications, security systems, and hypertext navigation including multi-modal navigation.

Speech recognition software can interact with many applications and systems that do not include a speech recognition capability. Some applications a speech recognition software may interact with include computer games, cell phone games, brain thought controlled games, multitouch interface games, spreadsheets, word processors, presentation software such as Powerpoint, productivity applications like Photoshop, enterprise applications, robotics applications, artificial intelligence applications, natural language processing applications, mobile applications, web applications, web services, cell phone applications, desktop applications, server applications, client applications, applications that have API's and API's that allow parameters to be passed to them. The interaction can encompass anywhere from complete control of an application via speech recognition to limited interactions. A speech recognition software may be a plug in for a web browser.

In order for a speech recognition software to interact with an application such as those listed above or others, a grammar may be required. The grammar may be in one of many different forms such as a XML file, other file type, dynamic data, or other data form, accessible by a speech recognition software. Most grammars generally may not be accessible by speech recognition software other than those they were designed to operate with. A grammar may be designed specifically to interact with one or more particular applications external to a speech recognition software. A grammar may be included with other information into a speech recognition profile for an application, designed specifically to interact with one or more applications external to a speech recognition software. Some existing speech recognition software currently allows a user to create a custom built speech recognition profile for a application, allowing the user to utilize the created custom speech recognition profile for an application in their speech recognition software to control the application it was built for, via speech commands.

Currently grammars, other files and other data used in speech recognition software to interact with other applications are not easily shared from user to user, and similarly from a first user's computing device to another user's computing device. Some manufacturers of speech recognition software may offer grammar replacements, but none offer solutions which may allow a first user to share a speech recognition profile for an application with other user(s) and their computing device(s).

As an example, there may be a clear benefit if a first user can share with one or more other users via a sharing interface, a speech recognition program profile created for use in a speech recognition software to control an application.

If an application is a game, there may be a clear benefit if a first user can share with one or more other users via a sharing interface, a speech recognition program profile created for use in a speech recognition software to control a game.

SUMMARY OF THE INVENTION

A method and system for sharing a speech recognition program profile for an application. The system provides computing devices, speech recognition software, storage systems that may include one or more databases, file system, one or more speech recognition program profiles for an application the speech recognition software may interact with, one or more sharing interfaces which may comprise one or more websites, database, web service, application, peer to peer networking, a sharing interface computer readable storage, a means to communicate from computing device to computing device and to and from sharing interfaces. A speech recognition program profile for an application may comprise a grammar file, a speech command actions file for an application, profile description data, application description data, user info, other data. Speech recognition program profiles for an application may be used by a user to cause a speech recognition software to interact with the application the profile was created for.

A user may utilize a speech recognition software, application, game or other means in a computing device to create a speech recognition program profile for an application that may comprise a grammar, speech commands actions for an application, application data, user info, other data that may comprise a grammar file name, speech command actions file name, application or game start speech command, application or game quit speech command, other speech commands. A speech recognition software in a computing device may store a speech recognition program profile for an application or game in a storage device.

Speech recognition software, application, game or other program in a computing device may transmit a speech recognition program profile for an application or game to a sharing interface which may store the transmitted speech recognition program profile for an application or game. The sharing interface may comprise a website, web service, database, file system, application, peer to peer network, file storage system where the speech recognition program profile for an application may be saved and shared. The sharing interface may be a server, computing device, computing appliance, mobile device such as a cellular phone. A sharing interface may be a forum. A sharing interface may be a social networking site. A sharing interface may be a online store.

The sharing interface may make information about one or more speech recognition program profiles for an application or game available via a display or other means to one or more users requesting the information. A user may view information about a speech recognition program profile for an application in a speech recognition software, website, webpage, list, database, file, other application or other display means.

A user may select one or more displayed speech recognition program profiles for an application that the user wants to download.

A user may download one or more selected speech recognition program profiles for an application from a sharing interface and they may be installed into a speech recognition software or other application which may itself be installed on a computing device. The speech recognition program profile for an application may persist inside the speech recognition software or application it is installed into and may be available for use anytime a user decides to use the speech recognition profile for an application.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 illustrates an exemplary sharing interface consistent with the present invention;

FIG. 6A illustrates an exemplary grammar file for an application;

FIG. 6B illustrates an exemplary actions file for an application;

FIG. 6C illustrates an exemplary grammar file for a game;

FIG. 6D illustrates an exemplary actions file for a game;

FIGS. 7A-D illustrates exemplary sharing interfaces;

FIGS. 8A-C illustrates exemplary various connections between a computing device with a speech recognition software and a sharing interface for one or more speech recognition program profiles for applications;

FIGS. 9A-C illustrates exemplary various connections between a computing device with a speech recognition software and a sharing interface for one or more speech recognition program profiles for games;

DETAILED DESCRIPTION

The present invention described below illustrates a system and method for sharing application profiles that may be used with a speech recognition software. The following detailed description of the invention refers to the accompanying drawings. The same reference numbers in different drawings identify the same or similar elements. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention. Also the following detailed description does not limit the invention. Instead, the scope of the invention is defined by the appended claims.

Exemplary Network

Figure 1:
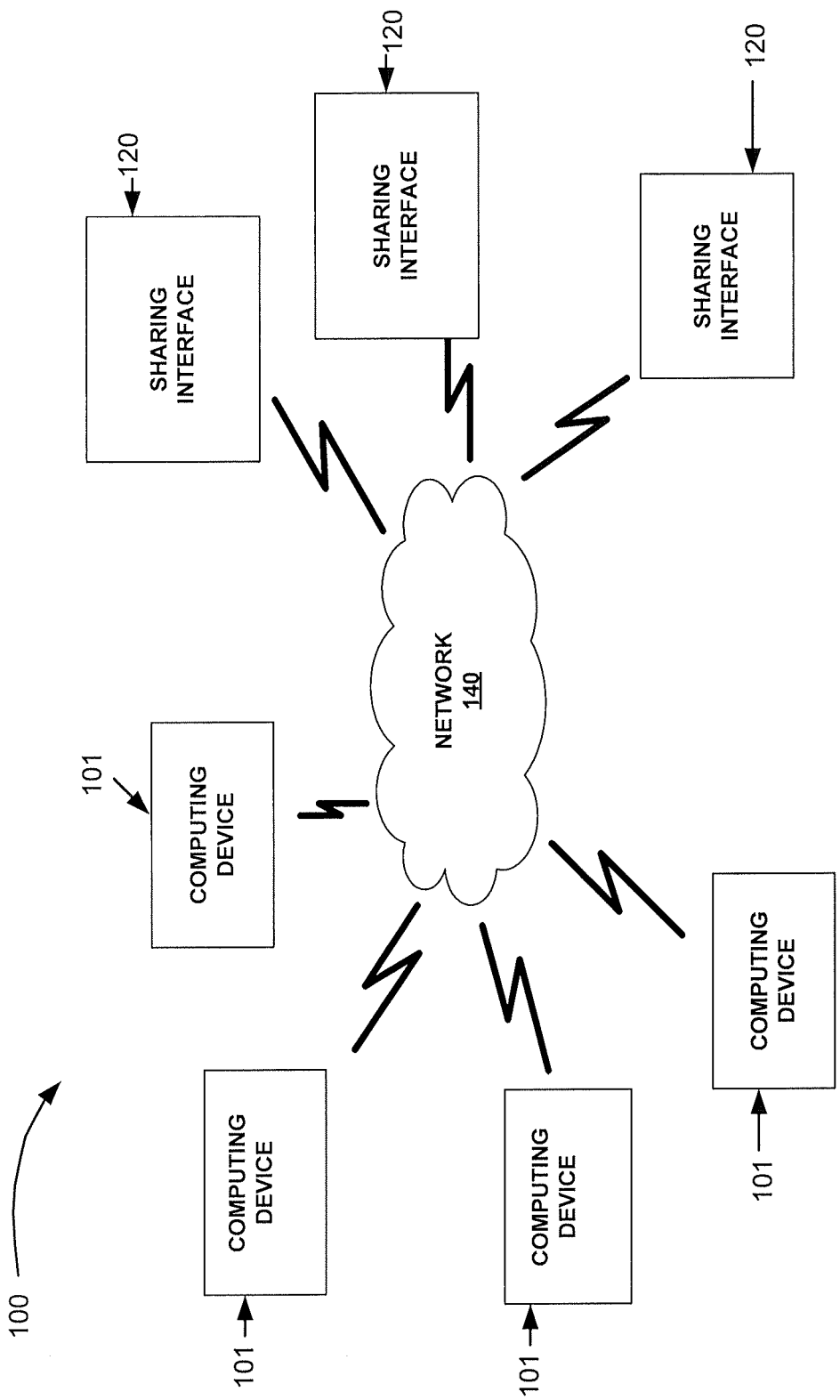
FIG. 1 illustrates an exemplary network in which a system and a method, consistent with the present invention may be implemented.

FIG. 1 illustrates an exemplary network 100 in which a system and method, consistent with the present invention, may be implemented. The network 100 may include multiple computing devices 101 connected to one or more sharing interfaces 120 or computing devices 101 via a network 140. The network 140 may include a local area network (LAN), a wide area network (WAN), a telephone network such as the Public Switched Telephone Network (PSTN), a wireless network, a optical network, a cellular network, an intranet, the Internet, other network, or a combination of networks. Four computing devices 101 and three sharing interfaces 120 have been illustrated as connected to network 140 for simplicity. In practice, there may be more or less computing devices 101 and sharing interfaces 120. Also, in some instances, a sharing interface 120 may perform the functions of a computing device 101 and a computing device 101 may perform the functions of a sharing interface 120. Also, in some instances, network 140 may perform the functions of a sharing interface 120 and a sharing interface 120 may perform the functions of a network 140.

The computing device 101 may include devices, such as mainframes, minicomputers, personal computers, laptops, tablets, personal digital assistants, telephones, console gaming devices, mobile gaming devices, set top boxes, TV, home appliances, computing appliances, autos, cell phones or the like, capable of connecting to the network 140. The computing device 101 may have a means for input, and may have a means for output. The computing device 101 may transmit data over the network 140 or receive data from the network 140 via a wired, wireless, audio, optical or other connection. In alternative implementations, the computing device 101 may comprise mechanisms for directly connecting to one or more sharing interface 120 or other computing devices 101.

The sharing interface 120 may include one or more types of computer systems, such as a mainframes, minicomputers, or personal computers, laptops, tablets, personal digital assistants, telephones, console gaming devices, mobile gaming devices, set top boxes, TV, home appliances, computing appliances, autos, cell phones or the like capable of connecting to the network 140 to enable sharing interface 120 to communicate with a computing device 101. The sharing interface 120 may have a means for input, and may have a means for output. In alternative implementations, the sharing interface 120 may include mechanisms for directly connecting to one or more computing devices 101. The sharing interface 120 may transmit data over network 140 or receive data from the network 140 via a wired, wireless, audio, or optical connection.

Exemplary Computing Device

Figure 2:
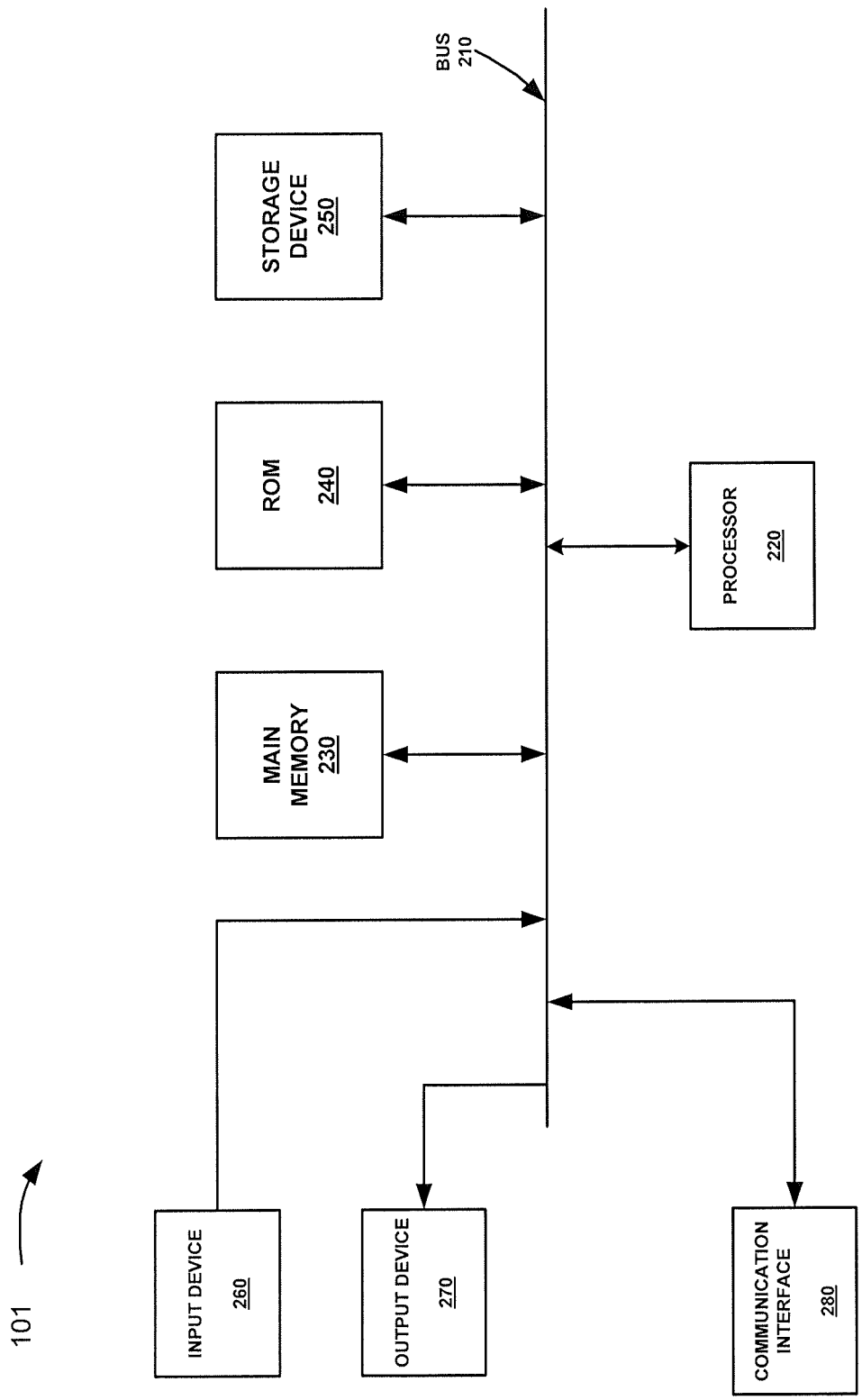
FIG. 2 illustrates an exemplary computing device consistent with the present invention.

FIG. 2 illustrates an exemplary computing device 101 consistent with the present invention. The computing device 101 may include a bus 210, a processor 220, a main memory 230, a read only memory (ROM) 240, a storage device 250, an input device 260, an output device 270, and a communication interface 280. The bus 210 may include one or more conventional buses that permit communication among the components of the computing device 101.

Computing device 101 may be a client device. Computing device 101 may be a server.

The processor 220 may include any type of conventional processor or microprocessor that interprets and executes instructions. The main memory 230 may include a random access memory (RAM), static memory or another type of storage device that stores information and instructions for execution by the processor 220. The ROM 240 may include a conventional ROM device or another type of static storage device that stores information and instructions for use by the processor 220. The storage device 250 may include a solid state drive, static storage device, magnetic and/or optical recording medium and its corresponding drive.

The input device 260 may include one or more conventional mechanisms that permit a user to input information to the computing device 101, such as a keyboard, a mouse, a pen, gesture recognition device, thought recognition device, biometric recognition device, a microphone, other mechanisms, etc. The output device 270 may include one or more conventional mechanisms that output information to a user, including a display, a printer, a speaker, etc. The communication interface 280 may include any transceiver-like mechanism that enables a computing device 101 to communicate with other devices and/or systems. For example, the communication interface 280 may include mechanisms for communicating with another device or system via a network, such as network 140.

As will be described in detail below, a computing device 101, consistent with the present invention, may perform certain inputting, creating, transmitting, receiving, selecting, downloading and updating related operations. The computing device 101 may perform these operations in response to processor 220 executing software instructions contained in a computer-readable medium, such as memory 230. A computer-readable medium may be defined as one or more memory 230 and/or carrier waves.

The software instructions may be read into memory 230 from another computer-readable medium, such as the data storage device 250, or from another device via the communication interface 280. The software instructions contained in memory 230 may cause processor 220 to perform the inputting, creating, transmitting, receiving, selecting, downloading and updating related activities described below. Alternatively, hardwired circuitry may be used in place of or in combination with software instructions to implement processes consistent with the present invention. Thus, the present invention is not limited to any specific combination of hardware circuitry and software.

Exemplary Sharing Interface

FIG. 3 illustrates an exemplary sharing interface 120 consistent with the present invention. The sharing interface 120 may include a bus 310, a processor 320, a memory 330, an input device 340, an output device 350, a communication interface 360, a storage device 370. The bus 310 may include one or more conventional buses that allow communication among the components of the sharing interface 120.

The processor 320 may include any type of conventional processor or microprocessor that interprets and executes instructions.

The memory 330 may include a RAM, ROM, another type of storage device that stores information and instructions for execution by the processor 320.

The input device 340 may include one or more conventional devices that permit an input of information to the sharing interface 120, such as a keyboard, a mouse, a pen, gesture recognition device, thought recognition device, biometric device, a microphone, other mechanisms, and the like. The output device 350 may include one or more conventional devices that outputs information to the operator, including a display, a printer, a speaker, etc. The communication interface 360 may include any transceiver-like mechanism that enables the sharing interface 120 to communicate with other devices and/or systems. For example, the communication interface 360 may include mechanisms for communicating with other sharing interfaces 120 or computing devices 101 via a network, such as network 140.

Sharing interface 120 may be a server. Sharing interface 120 may be a client device.

Execution of the sequences of instructions contained in memory 330 may cause processor 320 to perform the functions described below. In alternative embodiments, hardwired circuitry may be used in place of or in combination with software instructions to implement the present invention. Thus, the present invention is not limited to any specific combination of hardware circuitry and software.

Figure 4B:
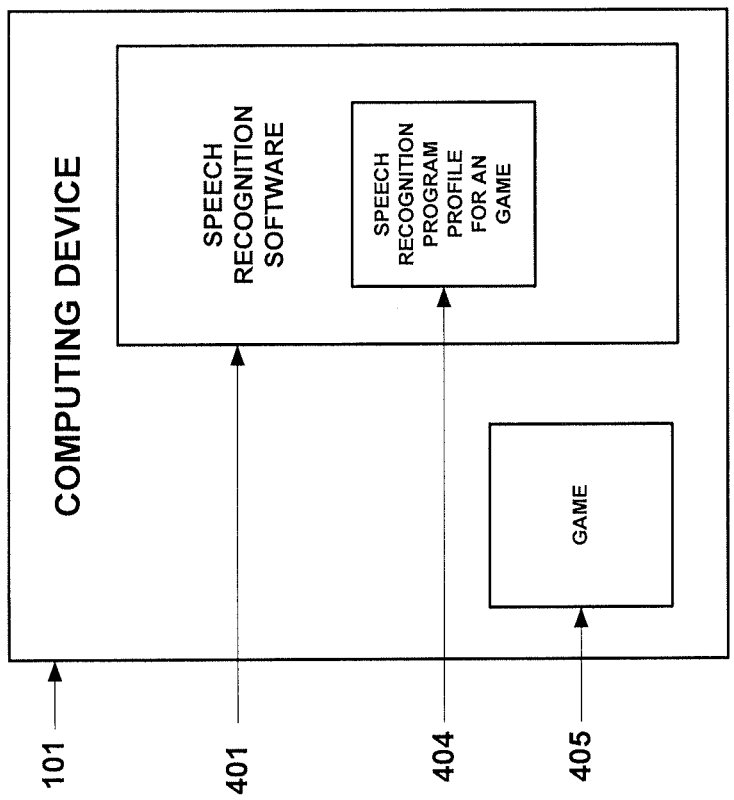
FIG. 4B illustrates an exemplary computing device comprising a speech recognition software and speech recognition program profile for a game and a game.
Figure 4A:
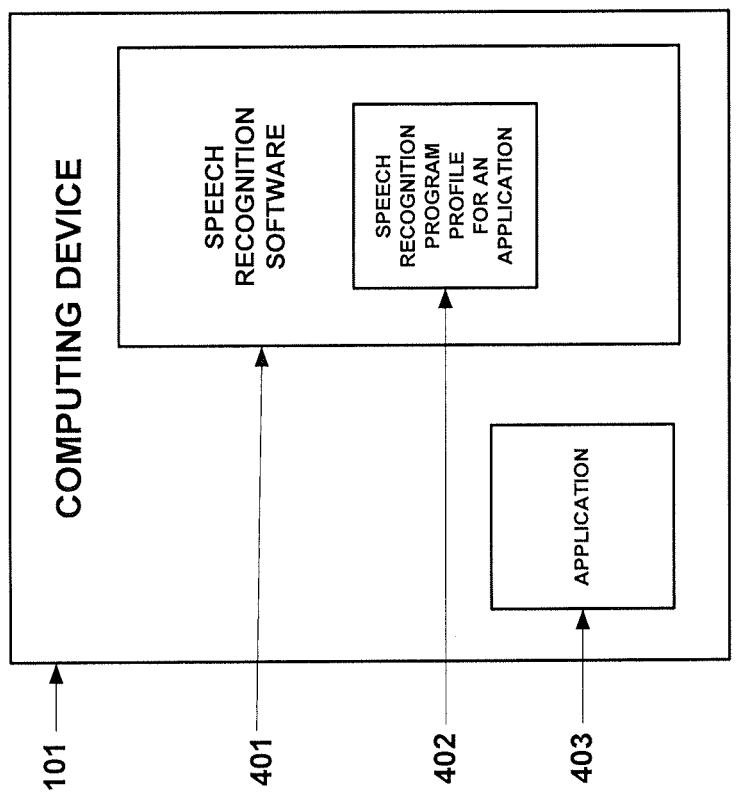
FIG. 4A illustrates an exemplary computing device comprising a speech recognition software and speech recognition program profile for an application and an application.

Exemplary Speech Recognition Program Profile for an Application in a Speech Recognition Software in a Computing Device FIG. 4A illustrates a computing device 101, consistent with the present invention, in which a speech recognition software 401 may be loaded into computing device 101. A speech recognition program profile for an application 402 may be loaded in a speech recognition software 401. A application 403 may be loaded in computing device 101. It will be appreciated, however, that one or more, computing devices 101, or sharing interfaces 120, may alternatively be loaded with a speech recognition software 401 and/or an application 403, and may perform the entire process or part of the process described below. Alternatively, more than one speech recognition software 401 may be loaded into a computing device

101. Alternatively, more than one speech recognition software 401 may be loaded into a sharing interface 120. Alternatively, more than one speech recognition program profiles for an application 402 may be loaded into a speech recognition software 401.

Speech recognition software 401 in computing device 101 may have components programmed into it that may be update-able, modify-able, replace-able, or delete-able.

Speech recognition software 401 may be a product such as tazti Speech Recognition, dictation software, voice search software, customizable speech recognition software or other speech recognition software and may have a means for input, and may have a means for output. Programming and operation of a product such as speech recognition software 401 is well known to those familiar in the art of speech recognition programming and not discussed in detail here.

A application 403 may be a product such as Acrobat, Aftereffects, Authorware, Business Catalyst, Captivate, Cold Fusion, Creative Suite, Director, Dreamweaver, Fireworks, Flash Builder, Flash Professional CS5, Illustrator CS 5, InCopy CS5, InDesign CS5, Pagemaker, Photoshop CS5, Photoshop Elements, Premiere, Excel, Powerpoint, MS Word, Visio, Outlook, Open Office, Moviemaker, Wireshark, Norton Antivirus, Maya, game software, a video game, a touchscreen application, a gesture based application, a biofeedback application, a thought input application, a web application, a web browser, a web service, a software with an API, a software with an API that allows parameters to be passed to it, a software with an API that allows data to be passed to it, a software that can control other devices, a software that can control other software, or other software and may have a means for input, and may have a means for output.

In another implementation of the current invention, computing device 101 may comprise more than one application 403.

Exemplary Speech Recognition Program Profile for a Game in a Speech Recognition Program in a Computing Device FIG. 4B illustrates a computing device 101, consistent with the present invention, in which a speech recognition software 401 may be loaded into computing device 101. A speech recognition program profile for a game 404 may be loaded in a speech recognition software 401. A game 405 may be loaded in computing device 101. It will be appreciated, however, that one or more, computing devices 101, or sharing interfaces 120, may alternatively be loaded with a speech recognition software 401 and/or a game 405, and may perform the entire process or part of the process described below. Alternatively, more than one speech recognition software 401 may be loaded into a computing device 101. Alternatively, more than one speech recognition software 401 may be loaded into a sharing interface 120. Alternatively, more than one speech recognition program profiles for a game 404 may be loaded into a speech recognition software 401.

Speech recognition software 401 in computing device 101 may have components programmed into it that may be update-able, modify-able, replace-able, or delete-able.

Speech recognition software 401 may be a product such as tazti Speech Recognition, dictation software, voice search software, customizable speech recognition software or other speech recognition software and may have a means for input, and may have a means for output. Programming and operation of a product such as speech recognition software 401 is well known to those familiar in the art of speech recognition programming and not discussed in detail here.

A game 405 may be a product such as a (MMO) massive multiplayer online game, (FPS) first person shooter game, online game, (RTS) real time strategy game, (RPG) role playing game, strategy game, puzzle game, multiplayer game, (MMORPG) massive multiplayer online role playing game, simulation game, arcade game, adventure game, educational game, driving game, text based game, console game, PC game, computer game, video game, card game, music game, virtual world, gambling game, chance game, sex game, gesture based game, thought controlled game, touch controlled game, marketing based game, free game, ad based game, biofeedback controlled game, combination of games, or other game.

In another implementation of the current invention, computing device 101 may comprise more than one game 405.

Figure 5A:
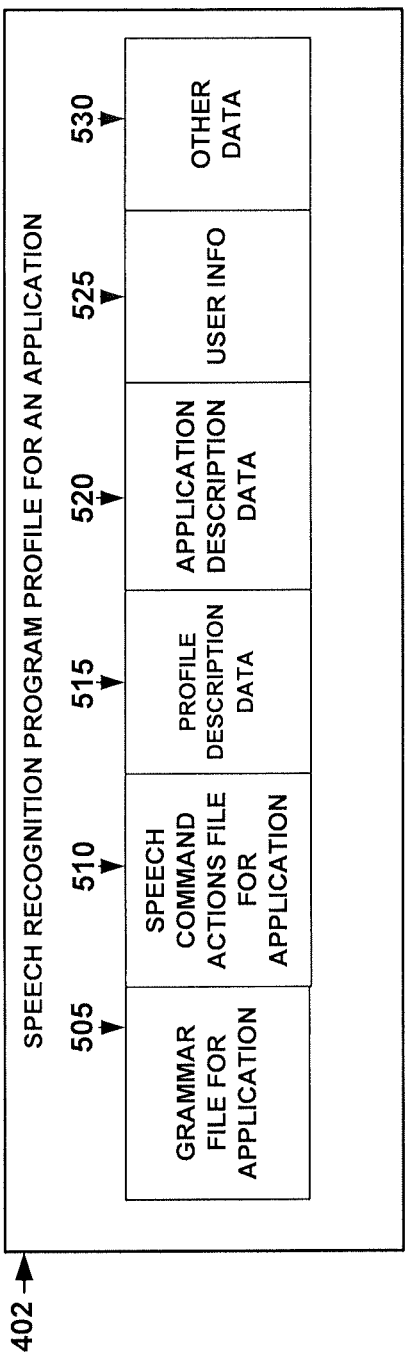
FIG. 5A illustrates an exemplary speech recognition program profile for an application.

FIG. 5A illustrates a speech recognition program profile for an application 402 consistent with the present invention. The speech recognition program profile for an application 402 may include a grammar file for an application 505, speech command actions file for an application 510, profile description data 515, application description data 520, user info 525, other data 530.

Figure 5B:
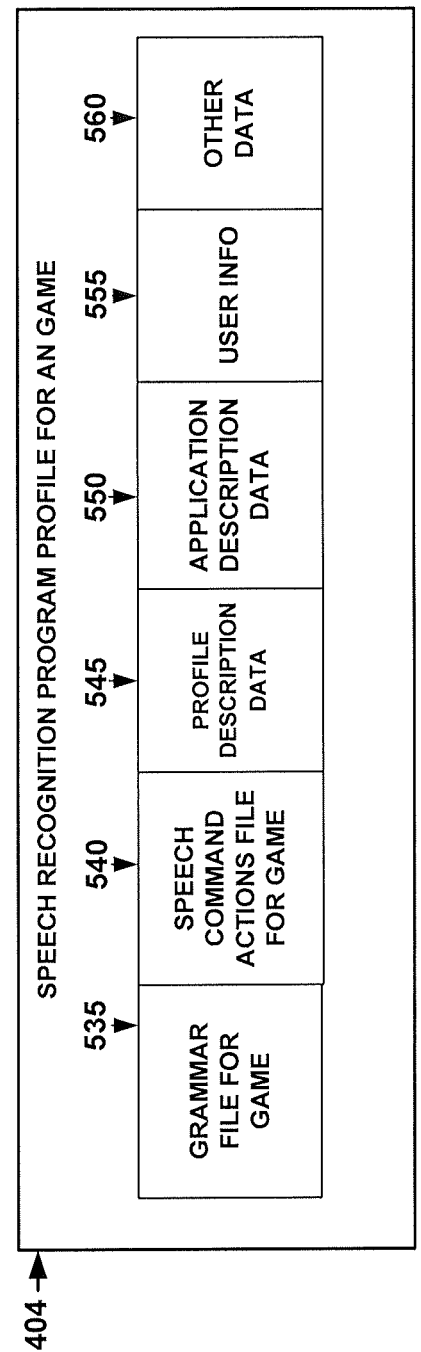
FIG. 5B illustrates an exemplary speech recognition program profile for a game.

FIG. 5B illustrates a speech recognition program profile for a game 404 consistent with the present invention. The speech recognition program profile for a game 404 may include a grammar file for a game 535, speech command actions file for a game 540, profile description data 545, game description data 550, user info 555, other data 560.

FIG. 6A illustrates a grammar file for an application 505 consistent with the present invention. The grammar file for an application 505 may comprise a grammar file name 605, start speech command 610, quit speech command 615, other speech commands 620.

FIG. 6B illustrates a speech command actions file for an application 510 consistent with the present invention. The speech command actions file for an application 510 may comprise an actions file name 625, start action 630, quit action 635, other actions 640.

FIG. 6C illustrates a grammar file for a game 535 consistent with the present invention. The grammar file for a game 535 may comprise a grammar file name 645, start speech command 650, quit speech command 655, other speech commands 660.

FIG. 6D illustrates a speech command actions file for a game 540 consistent with the present invention. The speech command actions file for an application 540 may comprise a actions file name 665, start action 670, quit action 675, other actions 680.

FIG. 7A illustrates a sharing interface 120 consistent with the present invention that may comprise a website 705.

FIG. 7B illustrates a sharing interface 120 consistent with the present invention that may comprise a database 710.

FIG. 7C illustrates a sharing interface 120 consistent with the present invention that may comprise a website 705 and a database 710. Website 705 and a database 710 may interact in order to store information being shared to sharing interface 120. Website 705 and a database 710 may interact in order to transmit from sharing interface 120, information being stored on sharing interface 120.

FIG. 7D illustrates a sharing interface 120 consistent with the present invention that may comprise a file sharing system 715.

Database 710 may also store data received from sources other than speech recognition software 401. Database 710 may store data as records of linked information. Database 710 may contain data stored in one or more files in an XML or other text format. Database 710 may contain one or more linked tables of data. Database 710 may store binary code. Database 710 may store binary data. Database 710 may store non-binary data. Database 710 may store analog data. Database 710 may store algorithms. Data stored in database 710 may be accessible by both speech recognition software 401 in computing device 101, and a website 705 in sharing interface 120. Data stored in database 710 may be accessible to other programs and systems. In an implementation consistent with the current invention database 710 may be a storage means.

Database 710 may reside in one or more sharing interfaces 120. Database 710 may be split up with various database components residing in one or more sharing interfaces 120 and/or computing devices 101. Database 710 may reside in a cloud system.

Database 710 may generate dynamic or other responses to requests.

Data and information may be added, modified, and deleted and retrieved from database 710. The operation of a database 710 is well known to those familiar with the art and is therefore not further described here. The operation of a website 705 is well known to those familiar with the art and is therefore not further described here.

FIG. 8A illustrates interaction that may occur between a computing device 101 that may comprise a speech recognition software 401, speech recognition program profile for an application 402, application 403; and a sharing interface 120 that may comprise a website 705. Interaction may occur between a computing device 101 and a sharing interface 120 via a network 140.

FIG. 8B illustrates interaction that may occur between a computing device 101 that may comprise a speech recognition software 401, speech recognition program profile for an application 402, application 403; and a sharing interface 120 that may comprise a database 710. Interaction may occur between a computing device 101 and a sharing interface 120 via a network 140.

FIG. 8C illustrates interaction that may occur between a computing device 101 that may comprise a speech recognition software 401, speech recognition program profile for an application 402, application 403; and a sharing interface 120 that may comprise a website 705 and a database 710. Interaction may occur between a computing device 101 and a sharing interface 120 via a network 140. Website 705 and a database 710 may interact.

FIG. 9A illustrates interaction that may occur between a computing device 101 that may comprise a speech recognition software 401, speech recognition program profile for a game 404, game 405; and a sharing interface 120 that may comprise a website 705. Interaction may occur between a computing device 101 and a sharing interface 120 via a network 140.

FIG. 9B illustrates interaction that may occur between a computing device 101 that may comprise a speech recognition software 401, speech recognition program profile for a game 404, game 405; and a sharing interface 120 that may comprise a database 710. Interaction may occur between a computing device 101 and a sharing interface 120 via a network 140.

FIG. 9C illustrates interaction that may occur between a computing device 101 that may comprise a speech recognition software 401, speech recognition program profile for a game 404, game 405; and a sharing interface 120 that may comprise a website 705 and a database 710. Interaction may occur between a computing device 101 and a sharing interface 120 via a network 140. Website 705 and a database 710 may interact.

Exemplary Sharing of a Speech Recognition Program Profile for an Application

Figure 10:
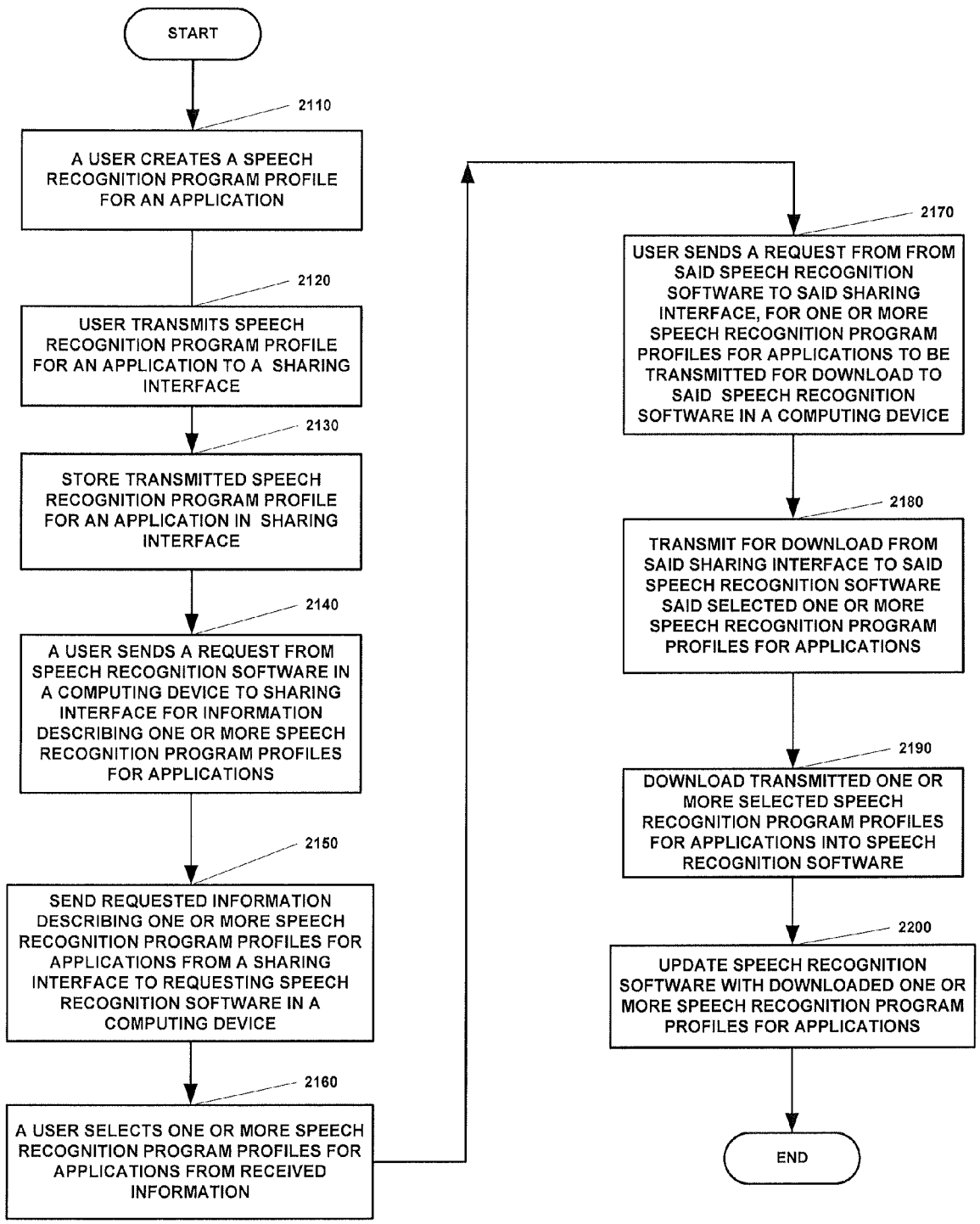
FIG. 10 illustrates exemplary profile for applications sharing process steps.

As shown in FIG. 10, processing may begin with a user of a plurality of users creating [act 2110] a speech recognition program profile for an application 402 that may be shared. A user may be a human, an artificially intelligent system, software, computer or robot. The act of creation may occur in a speech recognition software 401 in a computing device 101. Alternatively a user of a plurality of users may identify an existing speech recognition program profile for an application 402 in a speech recognition software 401 in a computing device 101, that may be shared.

Processing may continue as further illustrated in FIG. 8A, by a user transmitting [act 2120] a speech recognition program profile for an application 402 that is to be shared, from a speech recognition software 401 in a computing device 101, via a network 140, to a website 705 in a sharing interface 120. Alternatively as illustrated in FIG. 8B, a user may transmit [act 2120] a speech recognition program profile for an application 402 that is to be shared, from a speech recognition software 401 in a computing device 101, via a network 140, to a database 710 in a sharing interface 120. Alternatively as illustrated in FIG. 8C, a user may transmit [act 2120] a speech recognition program profile for an application 402 that is to be shared, from a speech recognition software 401 in a computing device 101, via a network 140, to a database 710 website 705 combination in a sharing interface 120.

Processing may continue with a sharing interface 120, storing [act 2130] a transmitted speech recognition program profile for an application 402 that is to be shared, in a website 705, database 710, website 705-database 710 combination or other storage means. The speech recognition program profile for an application 402 may now be in the sharing interface 120 and may be available for other users to view and download.

Processing may continue with a user who is interested in downloading a shared speech recognition program profile for an application 402, sending a request [act 2140] from a speech recognition software 401 in a computing device 101 to a sharing interface 120 for information describing one or more speech recognition program profiles for applications 402, that are available for download.

Sharing interface 120 may continue processing by sending [act 2150] the requested information describing one or more speech recognition program profiles for applications 402, from the sharing interface 120, to the requesting speech recognition software 401 in a computing device 101.

A user may then view in the speech recognition software 401 the received information describing one or more speech recognition program profiles for applications 402 and then may select from the received information [act 2160], one or more speech recognition program profiles for applications 402 that user may want to download from sharing interface 120 into speech recognition software 401 in computing device 101. User may then send from speech recognition software 401 in computing device 101, a request [act 2170] to sharing interface 120 for specifically selected one or more speech recognition program profiles for applications 402 to be transmitted for download to speech recognition software 401 in computing device 101.

Processing may continue with sharing interface 120 responding by transmitting [act 2180] selected one or more speech recognition program profiles for applications 402 to speech recognition software 401 in computing device 101 for download. Speech recognition software 401 in computing device 101 continues processing by downloading [act 2190] the transmitted selected one or more speech recognition program profiles for applications 402. Speech recognition software 401 in computing device 101 continues processing by updating itself [act 2200] with downloaded one or more speech recognition program profiles for applications 402.

An additional purpose of a speech recognition software 401 in computing device 101 interacting with a sharing interface 120, may be to create a user account that requires access credentials. An additional purpose of a speech recognition software 401 in computing device 101 interacting with a sharing interface 120, may be to log into a existing user account that may require access credentials. An additional purpose of a speech recognition software 401 in computing device 101 interacting with a sharing interface 120, may be to share personal or public information with other users who may have credentialed accounts. Users may be required to have credentialed accounts in order to upload and download speech recognition program profiles for applications 402 they want to share. Other interactions may occur.

Exemplary Sharing of a Speech Recognition Program Profile for a Game

Figure 11:
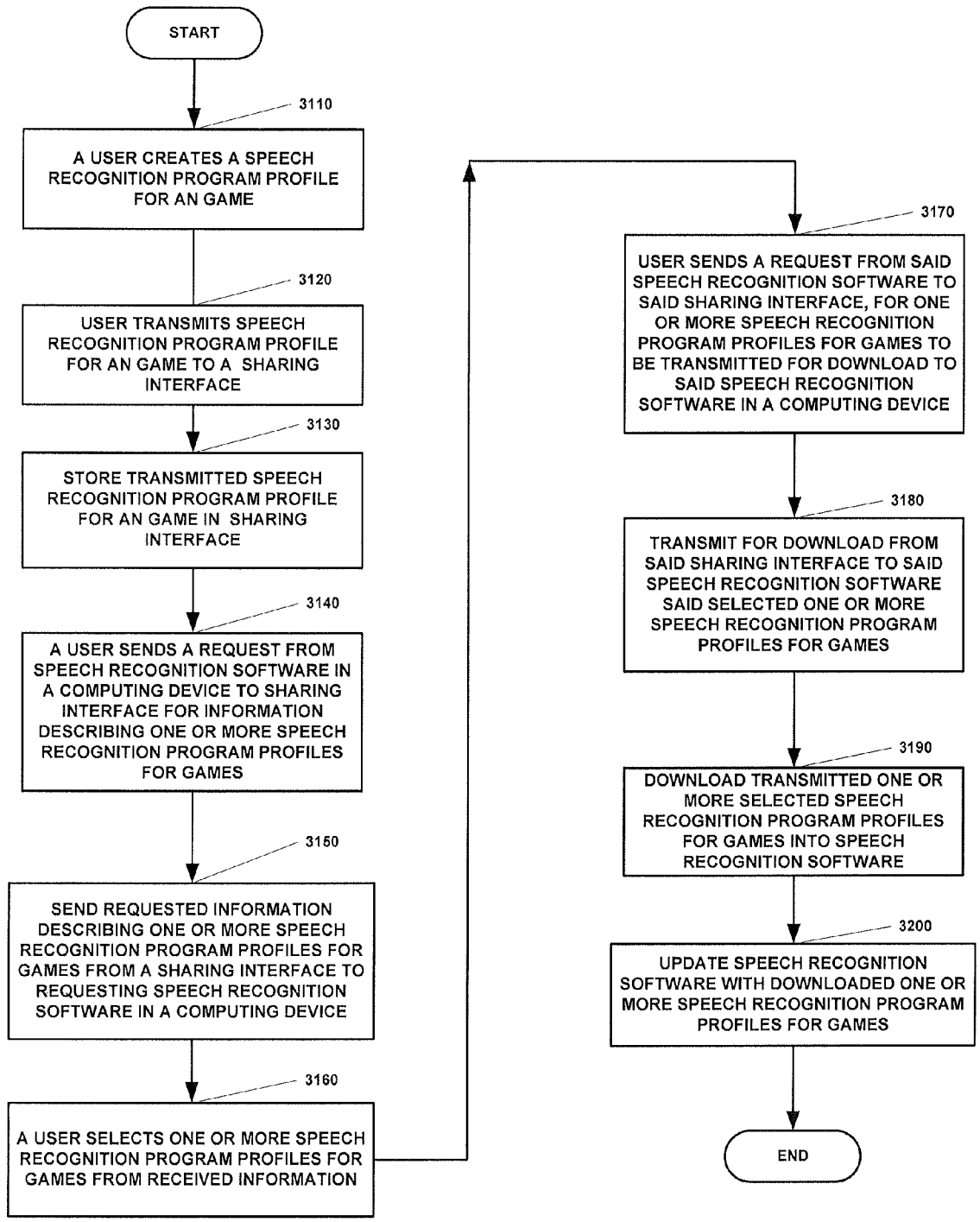
FIG. 11 illustrates exemplary profile for games sharing process steps.

As shown in FIG. 11, processing may begin with a user of a plurality of users creating [act 3110] a speech recognition program profile for a game 404 that may be shared, in a speech recognition software 401 in a computing device 101. A user may be a human, an artificially intelligent system, software, computer or robot. Alternatively a user of a plurality of users may identify an existing speech recognition program profile for a game 404 in a speech recognition software 401 in a computing device 101, that may be shared.

Processing may continue as further illustrated in FIG. 9A, by a user transmitting [act 3120] a speech recognition program profile for a game 404 that is to be shared, from a speech recognition software 401 in a computing device 101, via a network 140, to a website 705 in a sharing interface 120. Alternatively as illustrated in FIG. 9B, a user may transmit [act 3120] a speech recognition program profile for a game 404 that is to be shared, from a speech recognition software 401 in a computing device 101, via a network 140, to a database 710 in a sharing interface 120. Alternatively as illustrated in FIG. 9C, a user may transmit [act 3120] a speech recognition program profile for a game 404 that is to be shared, from a speech recognition software 401 in a computing device 101, via a network 140, to a database 710 website 705 combination in a sharing interface 120.

Processing may continue with a sharing interface 120 storing [act 3130] a transmitted speech recognition program profile for a game 404 that is to be shared, in a website 705, database 710, website 705-database 710 combination or other storage means. The speech recognition program profile for a game 404 may now be in the sharing interface 120 and may be available for other users to view and download.

Processing may continue with a user who is interested in downloading a shared speech recognition program profile for a game 404, sending a request [act 3140] from a speech recognition software 401 in a computing device 101 to a sharing interface 120 for information describing one or more speech recognition program profiles for games 404, that may be available for download.

Sharing interface 120 may continue processing by sending [act 3150] the requested information describing one or more speech recognition program profiles for games 404, from the sharing interface 120, to the requesting speech recognition software 401 in a computing device 101.

A user may then view in the speech recognition software 401 the received information describing one or more speech recognition program profiles for games 404 and then may select from the received information [act 3160], one or more speech recognition program profiles for games 404 that user may want to download from sharing interface 120 into speech recognition software 401 in computing device 101. User may then send from speech recognition software 401 in computing device 101, a request [act 3170] to sharing interface 120 for specifically selected one or more speech recognition program profiles for games 404 to be transmitted for download to speech recognition software 401 in computing device 101.

Processing may continue with sharing interface 120 responding by transmitting [act 3180] selected one or more speech recognition program profiles for games 404 to speech recognition software 401 in computing device 101 for download. Speech recognition software 401 in computing device 101 continues processing by downloading [act 3190] the transmitted selected one or more speech recognition program profiles for games 404. Speech recognition software 401 in computing device 101 continues processing by updating itself [act 3200] with downloaded one or more speech recognition program profiles for games 404.

In an implementation consistent with the present invention, files, data, executable code, and/or other information that may be transmitted from a sharing interface 120 to speech recognition software 401 in computing device 101, may be dynamically generated from database 710.

In another implementation of the current invention, a user may chat with other users via a computing device 101 interacting with one or more computing devices 101, via a sharing interface 120.

In another implementation of the current invention, a user's credentialed account in a sharing interface 120, may allow a user to enter personal data into an account and display some or all of entered data to other credentialed users. Personal data may comprise one or more of photos, multimedia, audio, gestures, personal information, public information, text, data, files, xml code, executable code, source code, art, software, likes and dislikes.

In another implementation of the current invention, a user's credentialed account may allow a user to select and de-select friends from among other users.

In another implementation of the current invention, a speech recognition program profile for an application 402, or a speech recognition program profile for a game 404, may comprise demographic data.

In another implementation of the current invention, a speech recognition program profile for an application 402, or a speech recognition program profile for a game 404, may comprise xml data.

In another implementation of the current invention, a first user of a plurality of users may be able to control which other users can download a speech recognition program profile for an application 402, or a speech recognition program profile for a game 404, that the first user uploaded into a sharing interface 120.

In another implementation of the current invention a speech recognition software 401 may interact with an application 403.

In another implementation of the current invention an application 403 may comprise a game 405. In another implementation of the current invention a speech recognition software 401 may interact with an application 403 that is a game 405.

In another implementation of the current invention, a display of one or more speech recognition program profiles for applications 402, or speech recognition program profiles for games 404, may be viewable in a web page appearing in a web browser. In another implementation of the current invention, a speech recognition software 401 may comprise a web browser. In another implementation of the current invention, a display of one or more speech recognition program profiles for applications 402, or speech recognition program profiles for games 404, may be viewable as a display within a speech recognition software 401.

In another implementation of the current invention website 705 may comprise a web service. In another implementation of the current invention a speech recognition program profile for an application 402 downloaded into a computing device 101 from a sharing interface 120 may automatically install into speech recognition software 401.

In another implementation of the current invention a speech recognition program profile for an application 402, or speech recognition program profile for a game 404, received into a computing device 101 from a sharing interface 120 may be one or more files that may replace previously installed one or more files in speech recognition software 401.

In another implementation of the current invention a application 403 may comprise a speech recognition software 401.

In another implementation of the current invention a automobile may comprise a computing device 101. In another implementation of the current invention a automobile may comprise a sharing device 120.

In another implementation of the current invention a user may share a speech recognition program profile for an application 402 between platforms such as windows operating system based personal computers, mac operating system based personal computers, chrome operating system based computers, android operating system based devices, windows phone operating system based devices, linux based computers, Wii, Playstation, Xbox, kinnect, other phone operating systems, or the like.

In another implementation of the current invention a user may share a speech recognition program profile for a game 404 between platforms such as windows operating system based personal computers, mac operating system based personal computers, chrome operating system based computers, android operating system based devices, windows phone operating system based devices, linux based computers, Wii, Playstation, Xbox, kinnect, other phone operating systems, or the like.

In another implementation of the current invention a user may further modify a speech recognition program profile for an application 402 that is installed in a speech recognition software 401 or application 403 in a computing device 101. A user may share any modified speech recognition program profile for an application 402 in the same process as previously described, then other users may download the modified speech recognition profile for an application 402.

In another implementation of the current invention a sharing interface 120 may be publicly available. A sharing interface 120 may not require any credentials for access to the sharing interface 120.

In another implementation of the current invention a sharing interface 120 may require a user to create an account with credentials to access the sharing interface 120. A users account may allow the user to add personal information to the account when logged in. An account may allow a user to share personal or public information with other users who have credentialed accounts. An account may allow a user to share speech recognition profiles for applications 402 with other users and allow the user to download speech recognition profiles for applications 402 from other credentialed users.

In another implementation of the current invention a credentialed account on a sharing interface may allow a user to perform other actions.

In another implementation of the current invention a credentialed account on a sharing interface 120 may be viewable in a online store, web page, or application, that may be a part of a speech recognition software 401, other application or other display means.

In another implementation of the current invention a user with a credentialed account may be able to track in their sharing interface 120 account all speech recognition program profiles for applications 402 shared to a sharing interface 120.

In another implementation of the current invention a user with a credentialed account may be able to associate personal information such as a user name, email address, photo, avatar, or other personal information to a speech recognition program profile for an application 402 and allow such information to appear on a sharing interface 120.

In another implementation of the current invention a sharing interface 120 may reward users for performing tasks such as sharing speech recognition program profiles for applications 402, reviewing other users shared speech recognition program profiles for applications 402, and other user actions. Users may be able to send notifications to social networking websites about actions a user performs in regard to a sharing interface 120, from within a user's credentialed account.

In another implementation of the current invention an administrator for a sharing interface 120 may make certain speech recognition program profiles for applications 402 available for purchase by users via online payment systems such as paypal that are well know by those familiar in the art and are not described here.

In another implementation of the current invention a speech recognition software 401 may display information related to one or more speech recognition program profiles for an application 402.

In another implementation of the current invention a sharing interface 120 may display information related to one or more speech recognition program profiles for an application 402.

In another implementation of the current invention an application 403 may display information related to one or more speech recognition program profiles for an application 402.

In another implementation of the current invention a game 405 may display information related to one or more speech recognition program profiles for a game 404.

In another implementation of the current invention the information related to one or more speech recognition program profiles for an application 402 may be printable through means familiar to those experienced in the art.

In another implementation of the current invention the information related to one or more speech recognition program profiles for a game 404 may be printable through means familiar to those experienced in the art.

In another implementation of the current invention a user may only create and share one or more speech recognition program profiles for an applications 402 to a sharing interface 120.

In another implementation of the current invention a user may only download one or more speech recognition program profiles for an applications 402 created and shared by other users to sharing interface 120.

In another implementation of the current invention a user may share one or more speech recognition program profiles for an applications 402 to sharing interface 120 and later download the same one or more speech recognition program profiles for an applications 402 user originally created and shared.

In another implementation of the current invention a user may create multiple speech recognition program profiles for an application 402. Each created speech recognition program profile for an application 402 may comprise similar information. Each created speech recognition program profile for an application 402 may comprise different information. Each created speech recognition program profile for an application 402 may comprise similar and different information. A user may create a speech recognition program profile for an application 402 for any application 403 or game 405.

CONCLUSION

A system and method for sharing speech recognition program profiles for an application that may be used with a speech recognition software. The system provides a speech recognition software in a computing device, a network, a sharing interface, and a storage means for storing speech recognition program profiles for an application and data that may be shared from a speech recognition software in a computing device to another speech recognition software in another computing device via a network and sharing interface. As example, a user may create a speech recognition program profile for an application such as Photoshop so that the Photoshop application may be controlled via speech recognition commands, may upload the created speech recognition program profile for an application that works with Photoshop to a sharing interface where other users may view profiles. The same or other users may select one or more uploaded speech recognition program profiles for applications in a sharing interface, may download the selected one or more speech recognition program profiles for applications into a speech recognition software installed in computing device, updating the speech recognition software, enabling the user to utilize the downloaded speech recognition program profile for an application for Photoshop to control Photoshop via speech recognition commands. In a similar manner a speech recognition profile for a game may be shared from one computing device to another computing device.

The scope of the invention is defined by the following claims and their equivalents.

We claim:

1. A method of sharing one or more speech recognition program profiles for applications, the method comprising:
   creating a speech recognition program profile for an application of a plurality of speech recognition program profiles for applications;
   transmitting said speech recognition program profile for a application of a plurality of speech recognition program profiles for applications from a first computing device of a plurality of computing devices to a sharing interface of a plurality of sharing interfaces, each said computing device of a plurality of computing devices comprising: speech recognition software;
   storing said speech recognition program profile for a application of a plurality of speech recognition program profiles for applications in said sharing interface of a plurality of sharing interfaces;
   sending a request from a requesting speech recognition software in a computing device of a plurality of computing devices to said sharing interface of a plurality of sharing interfaces, for information describing one or more speech recognition program profiles for applications of a plurality of speech recognition program profiles for applications, stored in said sharing interface of a plurality of sharing interfaces;
   sending from said sharing interface of a plurality of sharing interfaces to said requesting speech recognition software in a computing device of a plurality of computing devices, said requested information describing said one or more speech recognition program profiles for applications of a plurality of speech recognition program profiles for applications;
   selecting from received said information describing one or more speech recognition program profiles for applications of a plurality of speech recognition program profiles for applications, one or more of speech recognition program profiles for applications of a plurality of speech recognition program profiles for applications for download into said requesting speech recognition software in a computing device of a plurality of computing devices;
   sending a request from said requesting speech recognition software in a computing device of a plurality of computing devices to said sharing interface of a plurality of sharing interfaces, for selected said one or more of speech recognition program profiles for applications of a plurality of speech recognition program profiles for applications to be transmitted to said requesting speech recognition software in a computing device of a plurality of computing devices;
   transmitting from said sharing interface of a plurality of sharing interfaces to said requesting speech recognition software in a computing device of a plurality of computing devices, said selected one or more speech recognition program profiles for applications of a plurality of speech recognition program profiles for applications;
   downloading into said requesting speech recognition software in a computing device of a plurality of computing devices said selected one or more speech recognition program profiles for applications of a plurality of speech recognition program profiles for applications;
   updating said requesting speech recognition software in a computing device of a plurality of computing devices with said downloaded one or more speech recognition program profiles for applications of a plurality of speech recognition program profiles for applications;
   resulting in said requesting speech recognition software in a computing device of a plurality of computing devices being able to utilize said shared and downloaded one or more speech recognition program profiles for applications of a plurality of speech recognition program profiles for applications during the operation of said requesting speech recognition software in a computing device of a plurality of computing devices.

2. The method of claim 1 wherein the speech recognition program profile for a application of a plurality of speech recognition program profiles for applications is created in a computing device of a plurality of computing devices before being transmitted to a sharing interface of a plurality of sharing interfaces.

3. The method of claim 1 wherein the speech recognition program profile for a application further comprises a grammar.

4. The method of claim 1 wherein the speech recognition program profile for a application further comprises application actions associated to speech commands.

5. The method of claim 1 wherein the speech recognition program profile for a application further comprises user identification data.

6. The method of claim 1 wherein the speech recognition program profile for a application further comprises application identification data.

7. The method of claim 1 wherein a sharing interface comprises one or more website.

8. The method of claim 1 wherein a sharing interface comprises one or more databases of a plurality of databases.

9. The method of claim 1 wherein a sharing interface comprises one or more servers.

10. The method of claim 1 further comprising the step of creating a speech recognition program profile for a application in a speech recognition software.

11. The method of claim 1 further comprising the step of a non-speech recognition software creating said speech recognition program profile for a application.

12. The method of claim 1 further comprising the steps of:
modifying a speech recognition program profile for a application that has already been downloaded and updated in a speech recognition software of a plurality of speech recognition software;
sharing said modified speech recognition program profile for a application to a sharing interface of a plurality of sharing interfaces, making said modified speech recognition program profile for a application available for download into one or more additional computing devices.

13. The method of claim 1 wherein the sharing interface requires a user to open an account with credentials to access areas of said sharing interface.

14. The method of claim 1 wherein personal information may be shared along with a speech recognition program profile for a application.

15. A method of sharing one or more speech recognition program profiles for games, the method comprising:
creating a speech recognition program profile for an game of a plurality of speech recognition program profiles for games;
transmitting said speech recognition program profile for a game of a plurality of speech recognition program profiles for games from a first computing device of a plurality of computing devices to a sharing interface of a plurality of sharing interfaces, each said computing device of a plurality of computing devices comprising: speech recognition software;
storing said speech recognition program profile for a game of a plurality of speech recognition program profiles for games in said sharing interface of a plurality of sharing interfaces;
sending a request from a requesting speech recognition software in a computing device of a plurality of computing devices to said sharing interface of a plurality of sharing interfaces, for information describing one or more speech recognition program profiles for games of a plurality of speech recognition program profiles for games, stored in said sharing interface of a plurality of sharing interfaces;
sending from said sharing interface of a plurality of sharing interfaces to said requesting speech recognition software in a computing device of a plurality of computing devices, said requested information describing said one or more speech recognition program profiles for games of a plurality of speech recognition program profiles for games;
selecting from received said information describing one or more speech recognition program profiles for games of a plurality of speech recognition program profiles for games, one or more of speech recognition program profiles for games of a plurality of speech recognition program profiles for games for download into said requesting speech recognition software in a computing device of a plurality of computing devices;
sending a request from said requesting speech recognition software in a computing device of a plurality of computing devices to said sharing interface of a plurality of sharing interfaces, for selected said one or more of speech recognition program profiles for games of a plurality of speech recognition program profiles for games to be transmitted to said requesting speech recognition software in a computing device of a plurality of computing devices;
transmitting from said sharing interface of a plurality of sharing interfaces to said requesting speech recognition software in a computing device of a plurality of computing devices, said selected one or more speech recognition program profiles for games of a plurality of speech recognition program profiles for games;
downloading into said requesting speech recognition software in a computing device of a plurality of computing devices said selected one or more speech recognition program profiles for games of a plurality of speech recognition program profiles for games;
updating said requesting speech recognition software in a computing device of a plurality of computing devices with said downloaded one or more speech recognition program profiles for games of a plurality of speech recognition program profiles for games;
resulting in said requesting speech recognition software in a computing device of a plurality of computing devices being able to utilize said shared and downloaded one or more speech recognition program profiles for games of a plurality of speech recognition program profiles for games during the operation of said requesting speech recognition software in a computing device of a plurality of computing devices.

16. The method of claim 15 wherein the speech recognition program profile for a game of a plurality of speech recognition program profiles for games is created in a computing device of a plurality of computing devices before being transmitted to a sharing interface of a plurality of sharing interfaces.

17. The method of claim 15 wherein the speech recognition program profile for a game further comprises a grammar.

18. The method of claim 15 wherein the speech recognition program profile for a game further comprises actions associated to speech commands.

19. The method of claim 15 wherein the speech recognition program profile for a game further comprises user identification data.

20. The method of claim 15 wherein the speech recognition program profile for a game further comprises game identification data.

21. The method of claim 15 wherein the speech recognition program profile for a game further comprises data.

22. The method of claim 15 wherein the sharing interface comprises one or more website.

23. The method of claim 15 wherein the sharing interface comprises an online store.

24. The method of claim 15 wherein a game further comprises a video game.

25. The method of claim 15 wherein the sharing interface comprises one or more database.

26. The method of claim 15 wherein the sharing interface comprises peer to peer network technology.

27. The method of claim 15 wherein the sharing interface comprises cloud technology.

28. The method of claim 15 wherein the computing device is a mobile phone or the like.

29. The method of claim 15 wherein the computing device is a personal or tablet computer.

30. The method of claim 15 wherein the computing device is a game console.

31. The method of claim 15 wherein the computing device is a mobile game device.

32. The method of claim 15 wherein the computing device is a TV or set top box.

33. The method of claim 15 wherein the computing device is a client device.

34. The method of claim 15 wherein a sharing interface comprises one or more servers.

35. The method of claim 15 wherein a speech recognition software of a plurality of speech recognition software comprises one or more non-speech recognition software application.

36. The method of claim 15 wherein a game comprises a speech recognition software of a plurality of speech recognition software.

37. The method of claim 15 further comprising the step of: creating said speech recognition program profile for a game in a speech recognition software.

38. The method of claim 15 further comprising the step of: creating said speech recognition program profile for a game in a game.

39. The method of claim 15 further comprising the steps of:
modifying said speech recognition program profile for a game that has already been downloaded and updated in a loaded speech recognition software of a plurality of speech recognition software;
sharing said modified speech recognition program profile for a game to said sharing interface of a plurality of sharing interfaces, making said modified speech recognition program profile for a game available for download into one or more additional computing devices.

40. The method of claim 15 wherein the sharing interface requires a user to open an account with credentials to access areas of said sharing interface.

41. The method of claim 15 wherein personal information may be shared along with a speech recognition program profile for a game.

42. A speech recognition program profile for applications sharing system comprising:
a server apparatus of a plurality of server apparatuses communicate-able with a computing device of a plurality of computing devices that can be operated by a plurality of users, respectively, and a plurality of computing devices communicate-able with the plurality of server apparatus, the server apparatus comprising:
a server communication interface;
a server input means;
a server output means
a server memory unit comprising:
a speech recognition program profile for applications data area for storing speech recognition program profiles for applications data written therein;
and a server processor configured to execute the instructions to:
communicate speech recognition program profile for applications data with computing devices;
each of the computing devices comprising:
a computing device communication interface;
a computing device input means;
a computing device output means;
a computing device memory unit comprising:
a speech recognition program profile for applications data area for storing speech recognition program profile for applications data written therein;
a processor configured to execute the instructions to:
share speech recognition program profile for applications data with said server apparatus;
select one or more speech recognition program profiles for applications from a sharing interface for download into computing device;
download one or more speech recognition program profiles for applications from said server apparatus;
update a speech recognition software with downloaded one or more speech recognition program profile for applications data from said server apparatus.

43. The apparatus of claim 42, wherein the computing device is a client device.

* * * * *